July 3, 1951     G. M. McCORMICK     2,558,768

THERMOMETER HOLDER RELEASABLY ATTACHABLE TO BEDPOSTS

Filed Feb. 25, 1949

INVENTOR.
Gordon M. McCormick
BY Fred C. Matheny
ATTORNEY

Patented July 3, 1951

2,558,768

UNITED STATES PATENT OFFICE 2,558,768

THERMOMETER HOLDER RELEASABLY ATTACHABLE TO BEDPOSTS

Gordon M. McCormick, Spokane, Wash.

Application February 25, 1949, Serial No. 78,407

3 Claims. (Cl. 248—229)

This invention relates to a thermometer holder for use on the bed post of a hospital bed.

In hospitals and like places where a thermometer is assigned to each patient it is common practice to keep the thermometer in a glass tube which is secured to the bed post by adhesive tape. When this is done it is necessary to pull the adhesive tape off of the bed post and off of the glass tube each time the glass tube is to be cleaned and sterilized. This method uses up a substantial amount of adhesive tape and often leaves parts of the tape adhering to the bed post, and requires time and labor in applying and removing the tape and does not leave the glass tube adjustable on the bed post after it has been secured thereto.

In accordance with this invention I provide an all metal holder device which can quickly and easily be adjustably secured to a bed post and which is adapted to receive and hold a glass tube in which a thermometer is kept in such a manner that the glass tube can quickly and easily be removed for cleaning and sterilization and can be as quickly and easily replaced in the holder without removing the holder from the bed post.

Another object is to provide a tube holder formed of a helix of wire of open coil type whereby the said holder will not tend to collect dirt and can be quickly and easily sterilized.

Another object is to provide a holder for a glass tube which affords some protection to the tube and lessens the danger of breakage of the tube.

Another object is to provide a holder for a glass tube which can be quickly and easily secured to a bed post and which can easily be moved or adjusted on the bed post.

Other objects of the invention will be apparent from the following description taken in connection with the accompanying drawings.

In the drawings

Like reference numerals designate like parts throughout the several views.

Figure 1:
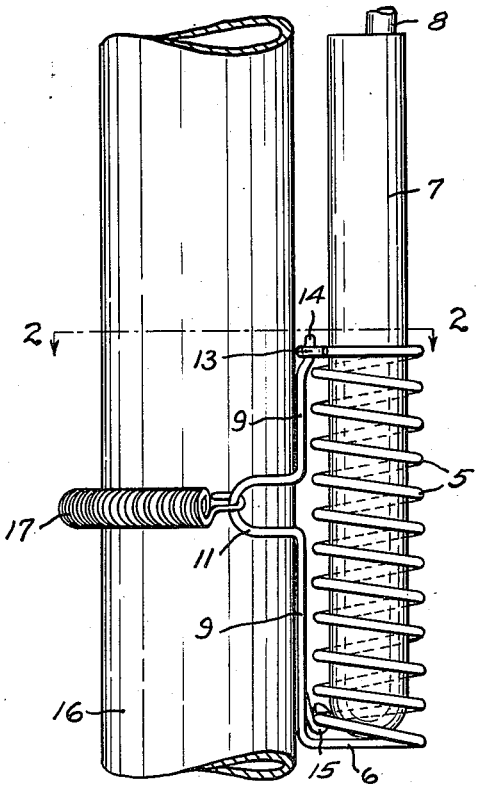
Figure 1 is a side elevation of a thermometer holder constructed in accordance with this invention, showing a metal holding device attached to a fragment of a bed post with a glass tube in the holding device and a fragment of a thermometer in the glass tube.

This thermometer holder comprises an open coil wire helix 5 of cylindrical shape having its lowermost coil formed to provide a cross bar 6 which extends across the bottom of the helix and forms a support on which the bottom end portion of a glass tube 7 can rest. The glass tube 7 is adapted to receive and hold a thermometer 8, a fragment of which is shown in Fig. 1.

A bracket for supporting the helix 5 is provided at one side of said helix. This bracket comprises two approximately parallel wires 9 and 10 which extend longitudinally of the helix 5 and are provided with outwardly bent U-shaped loops 11 and 12 respectively.

Preferably the helix 5 and the bracket comprising wire parts 9 and 10 and loops 11 and 12 are all formed of one continuous piece of wire, as follows: Starting with an eye member 13 at the top of the helix 5 this wire is shaped like a coil spring with widely separated coils to form the helix 5, thence it extends across the bottom of the helix to form the bottom cross bar 6, thence it extends upwardly to form the bracket wire 9 with the transversely extending loop 11, thence this wire passes through the eye member 13 where it is doubled upon itself to form a bight portion 14, thence this wire extends downwardly to form the bracket wire 10 with the transversely extending loop 12 and said wire terminates in an eye portion 15 bent around the lowermost coil of the helix. Preferably the bight portion 14 of the wire is offset toward the helix, as shown in Fig. 1, so that the eye member 13 can be clear of the bed post 16.

Figure 2:
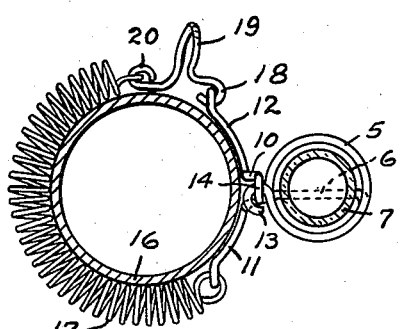
Fig. 2 is a sectional view, with parts in plan taken substantially on broken line 2—2 of Fig. 1.
Figure 3:
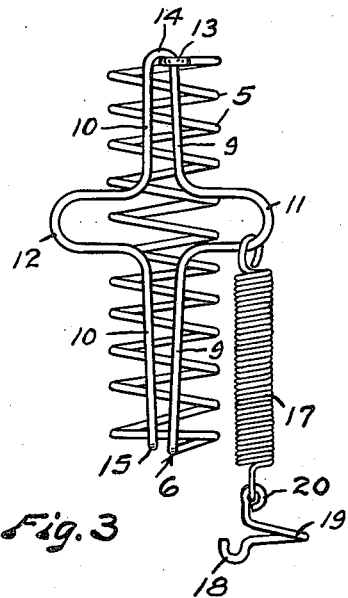
Fig. 3 is a detached view in rear elevation of a part of a thermometer holding device shown in Figs. 1 and 2, the glass tube being omitted.

The loops 11 and 12 are arcuately bent, as best shown in Fig. 2, to conform to the curvature of the bed post 16 and the wires 9 and 10, together with these loops 11 and 12, provide a bracket which rests firmly against the bed post 16 and conforms to the contour of said bed post 16.

A helical tension spring 17 has one end portion thereof permanently connected with one of the U shaped loops, such as the loop 11. A wire hook member 18 having a loop 19 by which it may be grasped by the fingers, is permanently connected by an eye member 20 with the other end portion of the helical tension spring 17.

The helix 5 is fastened to a bed post 16 by placing the bracket portion 9, 10, 11, 12 against the bed post, drawing the spring 17 around the bed post and engaging the hook 18 with the loop member 12. When thus applied to a bed post the helix 5 will be firmly supported in an upright position on the bed post and will provide a convenient receptacle to receive and support the glass tube 7 in an upright position so that a thermometer 8 can easily be placed in and removed from the glass tube.

The holder will not mar or damage the bed post and will not slide on the bed post but can be moved up or down or rotatively on said bed post without detaching it from the bed post if desired. Also this holder is of all metal construction and the parts thereof are all open and spaced apart so that they will not tend to collect dust and dirt and so that they can be easily and efficiently sterilized. The holder is easy to apply and remove from the bed post, is efficient in holding the glass tube 7 and affords the tube 7 some protection against breakage.

The foregoing description and accompanying drawings clearly disclose a preferred embodiment of my invention but it will be understood that this disclosure is merely illustrative and that changes may be made within the scope of the appended claims.

I claim:

1. A holder comprising an open-coil wire helix of cylindrical shape open at its top end and having means at its bottom end adapted to support a member disposed within said helix; bracket means comprising two substantially parallel spaced apart wires integral with said helix and extending longitudinally thereof along one side of said helix; resilient band means having one end portion thereof permanently connected with one wire of said bracket means; and readily releasable means adapted to releasably connect the other end portion of said resilient band means with the other wire of said bracket means, whereby said resilient band means can be drawn around a support to secure said helix to the support.

2. A thermometer holder of the class described comprising an open-coil wire helix of cylindrical form having an open top end and having a portion of its lowermost coil extending across the bottom end portion of the helix to provide a support, whereby a tubular thermometer receptacle can be placed in said helix and rest on said support; a bracket comprising two substantially parallel wires extending along one side of said helix and each connected with the top end portion and the bottom end portion of said helix; two oppositely directed loop portions extending sidewise from said two substantially parallel bracket wires approximately midway of the length of the helix, said loops being arcuately curved whereby they will fit an upright cylindrical bed post; a helical tension spring having one end portion permanently connected with one of said loops, said spring being adapted to extend around a bed post to secure said bracket and helix to a bed post with the helix substantially parallel with the bed post; and readily releasable means whereby the other end portion of said spring can be connected with the other loop.

3. The apparatus as claimed in claim 2 in which the helix and bracket are made of a single piece of wire.

GORDON M. McCORMICK.

REFERENCES CITED

The following references are of record in the file of this patent:

UNITED STATES PATENTS

| Number | Name | Date |
| --- | --- | --- |
| 1,325,807 | Siemann | Dec. 23, 1919 |
| 1,966,648 | Ryberg | July 17, 1934 |
| 2,191,782 | Valane | Feb. 27, 1940 |